United States Patent
Pojman et al.

(10) Patent No.: US 11,023,747 B2
(45) Date of Patent: Jun. 1, 2021

(54) METHOD, APPARATUS, AND SYSTEM FOR DETECTING DEGRADED GROUND PAINT IN AN IMAGE

(71) Applicant: HERE GLOBAL B.V., Eindhoven (NL)

(72) Inventors: Nicholas Pojman, San Francisco, CA (US); Anish Mittal, San Francisco, CA (US); David Lawlor, Chicago, IL (US); Zhanwei Chen, Richmond, CA (US)

(73) Assignee: HERE Global B.V., Eindhoven (NL)

( * ) Notice: Subject to any disclaimer, the term of this patent is extended or adjusted under 35 U.S.C. 154(b) by 79 days.

(21) Appl. No.: 16/293,328

(22) Filed: Mar. 5, 2019

(65) Prior Publication Data

US 2020/0285862 A1    Sep. 10, 2020

(51) Int. Cl.
*G06K 9/00*        (2006.01)
*G06T 7/10*        (2017.01)
(Continued)

(52) U.S. Cl.
CPC ......... *G06K 9/00798* (2013.01); *G06T 5/005* (2013.01); *G06T 7/0002* (2013.01);
(Continued)

(58) Field of Classification Search
CPC ............. G06K 9/00798; G06K 9/6202; G06T 2207/30256; G06T 2207/10024;
(Continued)

(56) References Cited

U.S. PATENT DOCUMENTS

| 7,840,086 B2 | 11/2010 | Bertozzi et al. |
| 8,477,999 B2 | 7/2013 | Nishida et al. |

(Continued)

FOREIGN PATENT DOCUMENTS

| EP | 1486799 A2 | 12/2004 |
| GB | 2510833 A | 8/2014 |
| JP | 2017020303 A | 1/2017 |

OTHER PUBLICATIONS

Yu et al., "Generative Image Inpainting with Contextual Attention", Mar. 21, 2018, pp. 1-15.
(Continued)

*Primary Examiner* — Margaret G Mastrodonato
(74) *Attorney, Agent, or Firm* — Ditthavong, Steiner & Mlotkowski

(57) ABSTRACT

An approach is provided for detecting degraded ground paint in an image. The approach, for example, involves performing semantic segmentation on the image to determine one or more pixels of the image that are classified in a ground paint category. The approach also involves generating a binary image that contains the one or more pixels of the image that are classified in the ground paint category. The approach further involves generating a hole-filled binary image by filling in the binary image to generate one or more curvilinear structures from the one or more pixels. The approach further involves determining a difference between the image and the hole-filled binary image to identify one or more degraded ground paint pixels of the image and providing the one or more degraded ground paint pixels as an output.

20 Claims, 13 Drawing Sheets

(51) Int. Cl.
*G06T 5/00* (2006.01)
*G06T 7/00* (2017.01)

(52) U.S. Cl.
CPC ...... *G06T 7/10* (2017.01); *G06T 2207/10024* (2013.01); *G06T 2207/30256* (2013.01)

(58) Field of Classification Search
CPC ......... G06T 7/90; G06T 5/005; G06T 7/0002; G06T 7/10
See application file for complete search history.

(56) References Cited

U.S. PATENT DOCUMENTS

| | | | |
|---|---|---|---|
| 2009/0088978 | A1 | 4/2009 | Ishikawa et al. |
| 2011/0282578 | A1* | 11/2011 | Miksa ..................... G01S 17/89 701/532 |
| 2015/0086112 | A1 | 3/2015 | Tian |
| 2015/0371094 | A1* | 12/2015 | Gardiner ................. E01C 23/01 348/148 |
| 2016/0275643 | A1 | 9/2016 | Sato et al. |
| 2016/0379081 | A1 | 12/2016 | Smith |
| 2017/0200058 | A1 | 7/2017 | Lin et al. |
| 2017/0213084 | A1 | 7/2017 | Akselrod et al. |
| 2017/0372493 | A1* | 12/2017 | Lu .......................... H04N 1/622 |
| 2018/0137612 | A1 | 5/2018 | Li et al. |
| 2020/0160547 | A1* | 5/2020 | Liu ......................... G06T 5/002 |

OTHER PUBLICATIONS

Rasmussen, "Road Shape Classification for Detecting and Negotiating Intersections", Published in: IEEE Intelligent Vehicles Symposium, 2003, pp. 1-6.

Amos, "Image Completion with Deep Learning in TensorFlow", Aug. 9, 2016, retrieved from http://bamos.github.io/2016/08/09/deep-completion/, pp. 1-31.

Office Action for corresponding European Patent Application No. 20161229.8-1210, dated Jun. 26, 2020, 6 pages.

* cited by examiner

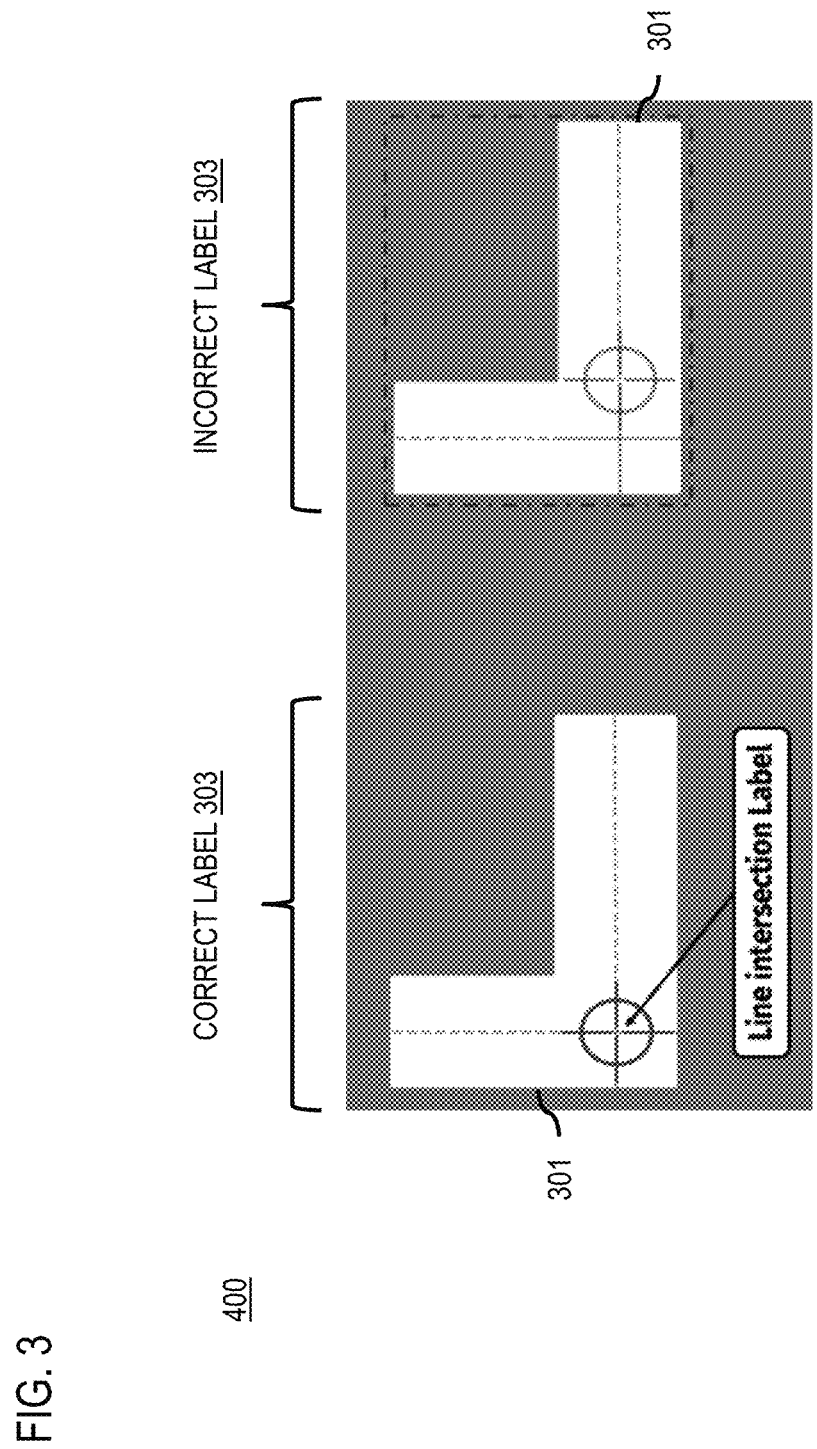

METHOD, APPARATUS, AND SYSTEM FOR DETECTING DEGRADED GROUND PAINT IN AN IMAGE

BACKGROUND

Modern location-based services and applications (e.g., autonomous driving) are increasingly demanding highly accurate and detailed digital map data (e.g., centimeter-level accuracy or better). To achieve such levels of accuracy, map service providers have traditionally used ground control points to precisely align and/or correct digital map data from different sources. Ground control points, for instance, are identifiable points on the Earth's surface that have precise three-dimensional location (e.g., latitude, longitude, and elevation). One area of development relates to determining ground control points from painted road markings that are identified from images (e.g., satellite images). However, such painted road markings are subject to degradation (e.g., paint fading, damage, wear, etc.), which can affect the accuracy of resulting ground control points. Accordingly, map service providers face significant technical challenges to identifying when images are affected by degraded ground paint.

SOME EXAMPLE EMBODIMENTS

Therefore, there is a need for an approach for automatically detect degraded ground paint in an image.

According to one embodiment, a computer-implemented method for detecting degraded ground paint in an image comprises performing semantic segmentation on the image to determine one or more pixels of the image that are classified in a ground paint category. The method also comprises generating a binary image that contains the one or more pixels of the image that are classified in the ground paint category. The method further comprises generating a hole-filled binary image by filling in the binary image to generate one or more curvilinear structures from the one or more pixels. The method further comprises determining a difference between the image and the hole-filled binary image to identify one or more degraded ground paint pixels of the image.

According to another embodiment, an apparatus for detecting degraded ground paint in an image comprises at least one processor, and at least one memory including computer program code for one or more computer programs, the at least one memory and the computer program code configured to, with the at least one processor, cause, at least in part, the apparatus to perform semantic segmentation on the image to determine one or more pixels of the image that are classified in a ground paint category. The apparatus is also caused to generate a binary image that contains the one or more pixels of the image that are classified in the ground paint category. The apparatus is further caused to generate a hole-filled binary image by filling in the binary image to generate one or more curvilinear structures from the one or more pixels. The apparatus is further caused to determine a difference between the image and the hole-filled binary image to identify one or more degraded ground paint pixels of the image.

According to another embodiment, a non-transitory computer-readable storage medium for detecting degraded ground paint in an image carries one or more sequences of one or more instructions which, when executed by one or more processors, cause, at least in part, an apparatus to perform semantic segmentation on the image to determine one or more pixels of the image that are classified in a ground paint category. The apparatus is also caused to generate a binary image that contains the one or more pixels of the image that are classified in the ground paint category. The apparatus is further caused to generate a hole-filled binary image by filling in the binary image to generate one or more curvilinear structures from the one or more pixels. The apparatus is further caused to determine a difference between the image and the hole-filled binary image to identify one or more degraded ground paint pixels of the image.

According to another embodiment, an apparatus for detecting degraded ground paint in an image comprises means for performing semantic segmentation on the image to determine one or more pixels of the image that are classified in a ground paint category. The apparatus also comprises means for generating a binary image that contains the one or more pixels of the image that are classified in the ground paint category. The apparatus further comprises means for generating a hole-filled binary image by filling in the binary image to generate one or more curvilinear structures from the one or more pixels. The apparatus further comprises means for determining a difference between the image and the hole-filled binary image to identify one or more degraded ground paint pixels of the image.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a diagram illustrating an example of correct and incorrect labeling a ground paint feature, according to one embodiment;

DESCRIPTION OF SOME EMBODIMENTS

Examples of a method, apparatus, and computer program for detecting degraded ground paint in an image are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
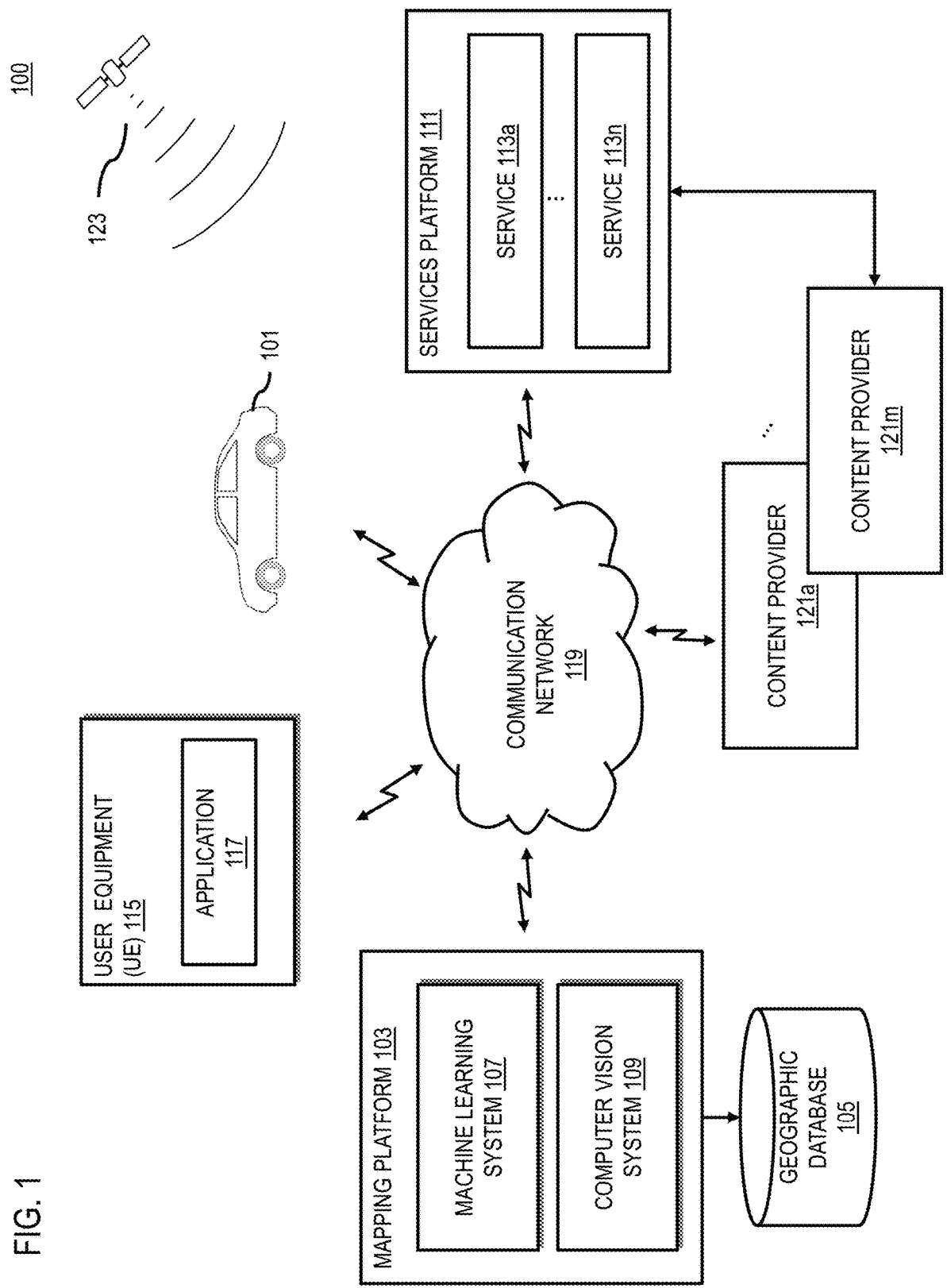
FIG. 1 is a diagram of a system capable of detecting degraded ground paint in an image, according to one embodiment.

FIG. 1 is a diagram of a system capable of detecting degraded ground paint in an image, according to one embodiment. As indicated above, many location-based services and applications rely on accurate map data. For example, automated driving is quickly becoming a reality following advances in machine learning, computer vision, and compute power. The ability to perceive the world with an accurate semantic understanding enables vehicles (e.g., an autonomous vehicle 101) to obey driving rules and avoid collisions. As these perceptual abilities have improved, so too has the need for highly accurate and up-to-date maps. Path planning, for instance, requires knowledge of what to expect beyond a vehicle 101's perceptual horizon, and driving in complicated urban environments with many occluding objects requires a knowledge of what cannot be detected by onboard sensors.

In response, map service providers (e.g., operating a mapping platform 103) are creating the most accurate and up-to-date high-resolution map for automated driving (e.g., a geographic database 105). To facilitate and/or monitor the accuracy of digital map data stored in the geographic database 105, map service providers can designate ground control points. In one embodiment, ground control points are defined as identifiable points on the Earth's surface that have precise location (e.g., in the form of <Latitude, Longitude, Elevation>) associated with them. These points play a vital role in being able to measure the quality and correction of different data sources.

In other embodiments, ground control points find additional applications in camera pose refinement of satellite, aerial and ground imagery, and hence provide for increased position fidelity for location data determined from these data sources. In turn, any derived products like building polygons, map objects made from these data sources inherit the accuracy. In addition, ground control points can also serve the localization of the automated car use case where they can be geocoded localization objects that car can measure its position with respect to.

Traditionally, ground control points are collected by ground surveyors who go out in the field and use instruments like a theodolite, measuring tape, three-dimensional (3D) scanner, satellite-based location sensors (e.g., GPS/GNSS), level and rod, etc. to measure the locations of ground control points with respect to the locations of distinguishable landmarks on the Earth (e.g. parts of signs, barriers, buildings, road paint, etc.). Collecting each ground control point using traditional manual means requires a substantial amount of infrastructure and manual resources. The problems become even more pronounced if the ground control points need to be measured on the road (e.g., for map making use cases) since special access permissions need to be obtained from the government or other responsible authorities. Because of the infrastructure and resource burden, the process of obtaining ground control points using traditional means is not scalable if they need to be used in map making and evaluation process.

To address the limitations of GCP collections, an efficient labeling process could be designed to allow for the generation of virtually-derived ground control points (vGCP) using imagery (e.g., satellite imagery and/or ground-level imagery). The aim is to generate tie point labels across collections of satellite imagery and terrestrial ground imagery, so the points could be triangulated from the satellite imagery and tied to the ground imagery to judge the quality of the pose or to correct it to generate accurate vGCPs.

In one embodiment, the system 100 may define criteria for selecting real world features that are suitable to be labeled as a tie point across images and ultimately turned into a vGCP. These criteria include but are not limited to any combination of:

(a) The selected feature should be visible across image perspectives (aerial/satellite/ground);
(b) The selected feature should be uniquely distinguishable;
(c) The selected feature should be spatially distributed;
(d) The selected feature should be generalizable across the world; and
(e) The selected feature should have a consistent representation so that it can be learned and detected by machine learning models (e.g., by a machine learning system 107 alone or in combination with a computer vision system 109).

Painted line intersections or other painted road features (e.g., lane markings, etc.) are an ideal feature type to be used as a tie point feature. In one embodiment, painted line intersections are defined as the intersection of two or more curvilinear painted line markings on a roadway. In some use cases, the system 100 can exclude painted road markings, which are part of a repeated/patterned area of paint to ensure greater feature sparsity. The distinct geometric paint patterns associated intersections generally meet all of the criteria listed above and therefore can be used to determine vGCPs.

Figure 2:
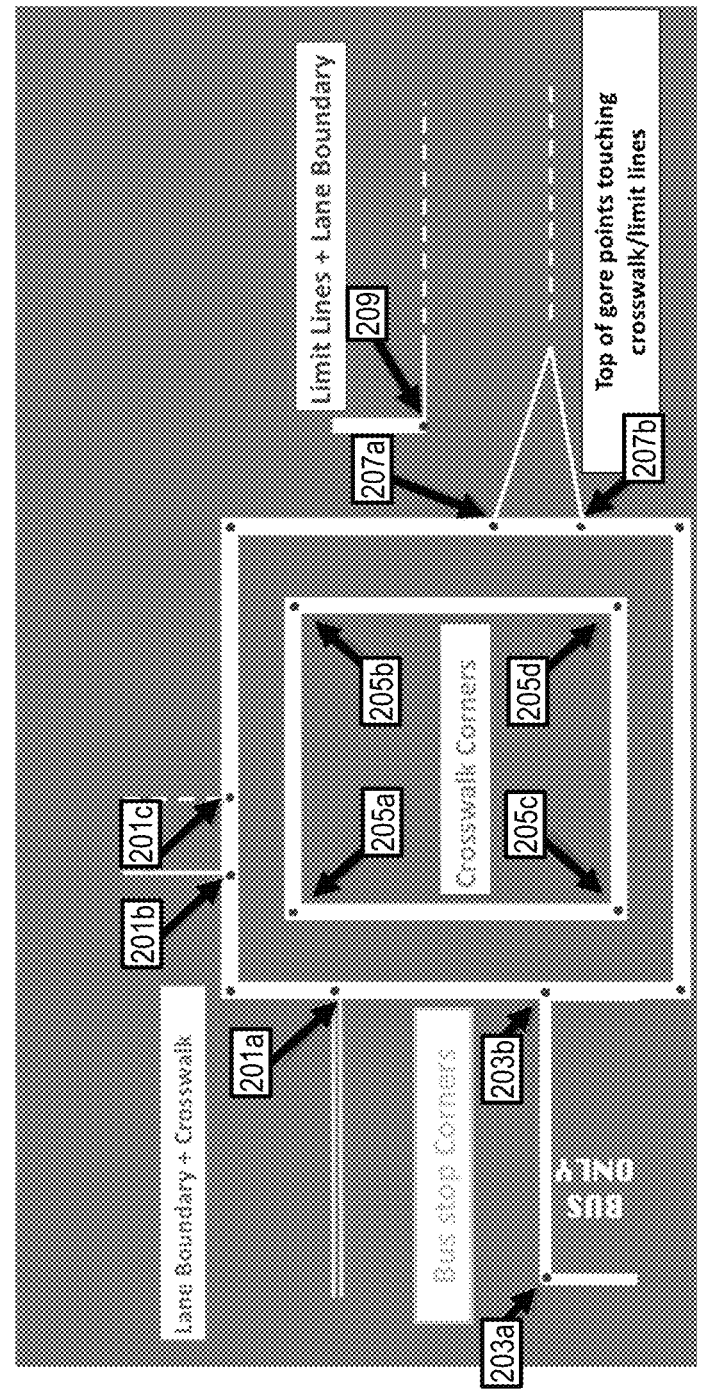
FIG. 2 is a diagram illustrating example ground paint features that can be used as ground control points, according to one embodiment.

For example, FIG. 2 is a diagram illustrating example intersection features that can be found at a typical intersection, according to one embodiment. The example of FIG. 3 illustrates a schematic drawing of a typical intersection 200 at which intersection features created by various geometries of the lane lines, crosswalks, bus stops, and/or any other identifiable object or marking can be found. An intersection refers, for instance, to a geographic area at which two or more road segments intersect, converge, and/or diverge. As shown, intersection features in the category of curvilinear geometry include but are not limited to:

(1) Points 201a-201c at which a lane boundary (e.g., lane line or marking) meets a crosswalk;
(2) Points 203a and 203b that correspond to the corners of road markings indicating a bus stop;
(3) Points 205a-205d that correspond to the corners of a crosswalk;
(4) Points 207a and 207b that are the top of gore points touching a crosswalk or limit lines (e.g., lines designating the limit or boundaries of other features such as lanes); and
(5) Point 209 at which a limit line meets a lane boundary.

The intersection features identified above typically meet the criteria or properties for generating vGCPs and therefore imagery depicting these features can be provided for human labeling or annotation. This labeling can be used to generate ground truth or training data sets for the machine learning system 107 to automatically detect vGCPs from images. By way of example, the labeling process for generating vGCPs demands high precision from all human-generated labels because even small mistakes (e.g., mislabeling of the feature by two or more pixels) can end up creating triangulation errors that are outside the bounds of acceptable for a vGCP to be used. In one embodiment, as shown in FIG. 3, the labeling process asks a human user to label a specific part of a painted line intersection feature—the center point where the midlines of two or more painted lines intersect. In the example of FIG. 3, a human labeler is asked to label the center point of an "L" shaped intersection 301. The correct label 303 for the intersection 301 is at the intersection of the midline. In contrast, a labeling mistake that shifts one pixel to the right as shown in the incorrect label 305 can potentially result in significant triangulation errors for the vGCP.

Degradation or other damage to the road paint can make identifying this center point even more challenging for users to label with a target amount of precision. For example, paint on road surfaces is generally known to deteriorate or degrade across time due to sun, weather, construction, and of course wear traffic. At the same time, the vGCP generating process needs to be optimized to support obtaining the maximum amount of vGCPs given a limited set of available of imagery. Because of resource constraints and other restrictions (e.g., permitting, regulatory restrictions, etc.), it can be common for there to be months or years elapsed between imagery collection (e.g., satellite and/or ground level imagery) for a given geographic area. The greater the elapsed time across images within a collection of images, the greater the likelihood and severity of degradation of painted line intersections that human labelers may use for correspondence measurement and vGCP generation, thereby resulting in significant technical challenges for enabling the use of imagery depicting degraded ground paint for labeling and/or any other application demanding high precision and accuracy.

Figure 4B:
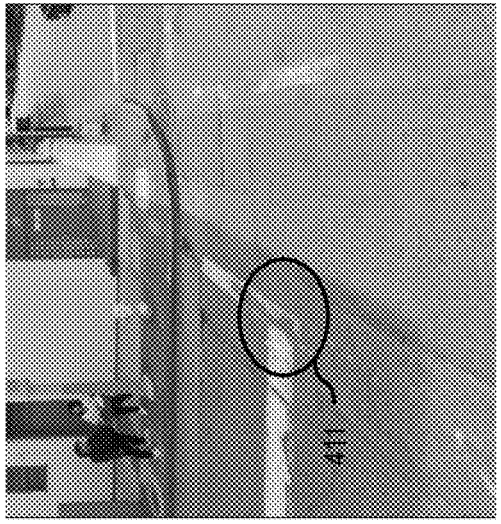
FIGS. 4A-4D are diagrams illustrating examples of degraded ground paint, according to one embodiment.
Figure 4D:
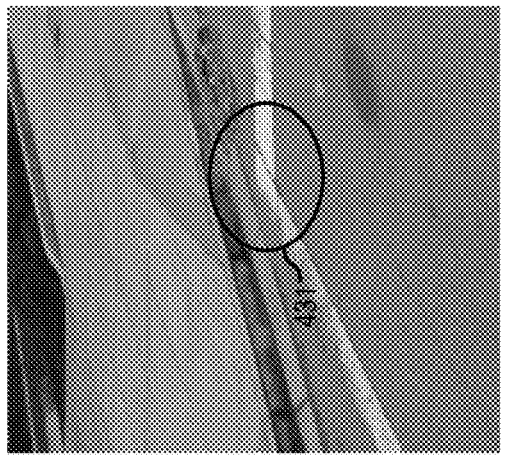
Figure 4A:
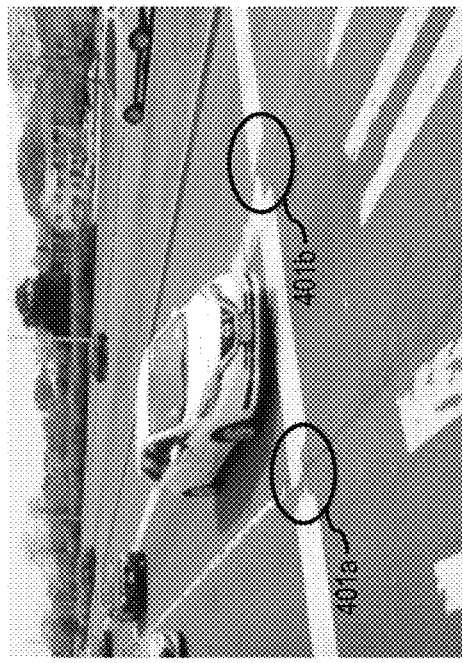
Figure 4C:
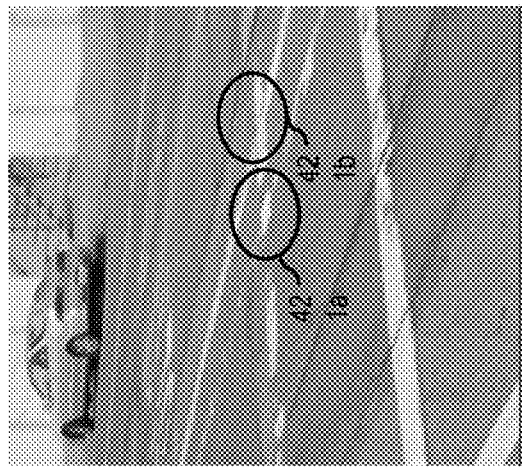

Examples of images depicting degraded ground paint at intersections are shown in FIGS. 4A-4C. For example, FIG. 4A depicts two intersection features 401a and 401b with degraded paint that can make precise labeling of their center points challenging. Similarly, FIG. 4B depicts an intersection feature 411 with degraded ground paint, FIG. 4C depicts intersection features 421a and 421b with degraded ground paint, and FIG. 4D depicts intersection feature 431 with degraded ground paint. In each case, accuracy of vGCPs generated from the illustrated intersection features can be reduced because of the paint deterioration.

To address these challenges, the system 100 of FIG. 1 introduces a technical solution to the problems created by road or ground paint degradation so that the precise location of painted ground features can be labeled in multiple images. In one embodiment, the system 100 uses image inpainting or "hole-filling" to fill in the painted regions of an image that is missing because of paint degradation. In other words, the system 100 uses image hole-filling to fill the missing painted regions of the image so that the output image will appear to have no missing semantic information (i.e., appear to have no missing painted regions that have faded or disappeared because of paint degradation or other damage). The various embodiments described herein refill degraded or faded paint in images to enable improved labeling of the line intersections by using a content-aware process that is designed to correct degraded ground paint to expected structures or shapes (e.g., intersection related features or shapes when correcting paint for such features).

Figure 5:
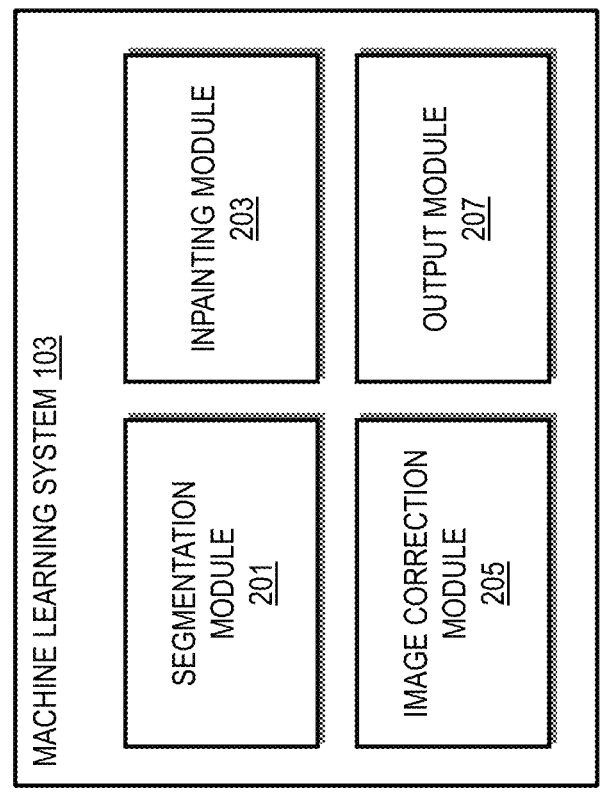
FIG. 5 is a diagram of components of a mapping platform capable of detecting degraded ground paint in an image, according to one embodiment.

In one embodiment, as shown in FIG. 5, the mapping platform 103 includes one or more components for detecting and/or correcting degraded ground paint in an image, according to the various embodiments described herein. It is contemplated that the functions of these components may be combined or performed by other components of equivalent functionality. In one embodiment, in addition to the machine learning system 107 and computer vision system 109 as shown in FIG. 1, the mapping platform 103 includes a segmentation module 201, inpainting module 203, image correction module 205, and output module 207. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of the services platform 111, services 113a-113n (also collectively referred to as services 113), vehicle 101, a user equipment (UE) 115, application 117 executing on the UE 115, etc.). In another embodiment, one or more of the modules 201-207 may be implemented as a cloud-based service, local service, native application, or combination thereof. The functions of the mapping platform 103 and the modules 201-207 are discussed with respect to FIGS. 6-8 below.

Figure 6:
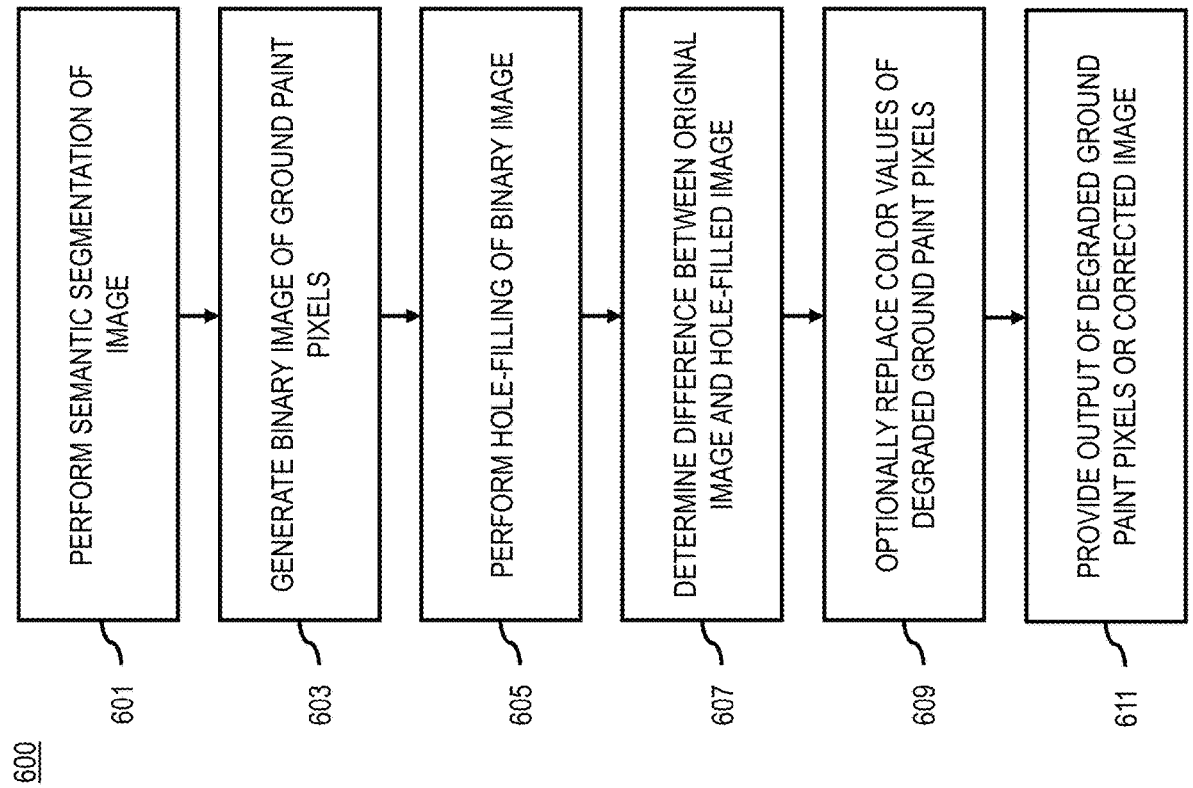
FIG. 6 is a flowchart of a process for detecting degraded ground paint in an image, according to one embodiment.
Figure 9:
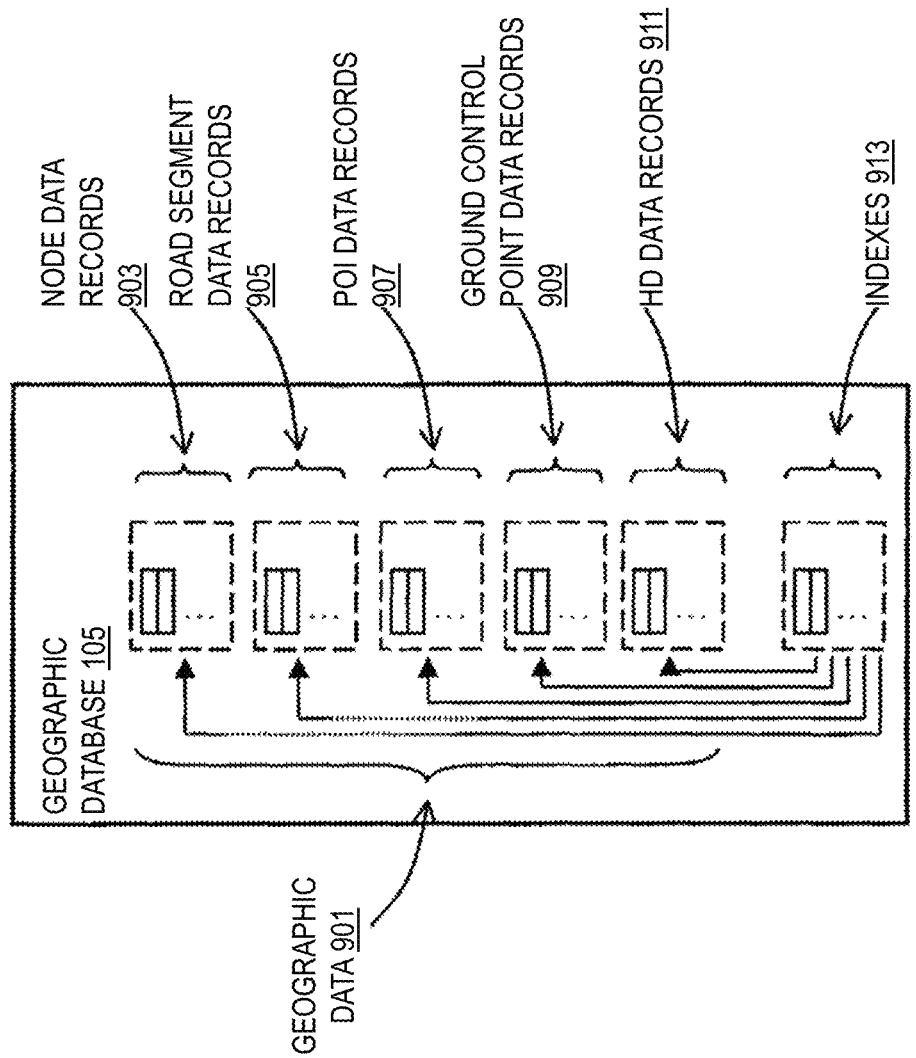
FIG. 9 is a diagram of a geographic database, according to one embodiment.

FIG. 6 is a flowchart of a process for detecting degraded ground paint in an image, according to one embodiment. In various embodiments, the mapping platform 103 and/or any of the modules 201-207 may perform one or more portions of the process 300 and may be implemented in, for instance, a chip set including a processor and a memory as shown in FIG. 9. As such, the mapping platform 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 601, the segmentation module 201 performs semantic segmentation on an image being evaluated or process for detecting degraded ground paint. In one embodiment, the semantic segmentation process includes processing the image to classify the pixels of the image into either a ground paint category or a non-ground paint category. The segmentation module 201 can use a swath of labeled semantic images (e.g., a training dataset of images that are labeled with ground truth sematic categories such as ground paint versus non-ground paint) to train the machine learning system 107 alone or in combination with the computer vision system 109 to make label inferences or predictions to semantically categorize the pixels or groups of pixels of the image. In other words, the segmentation module 201 can use perceptual information (e.g., provided by the machine learning system 107 and/or computer vision system 109) to identify the degraded or faded ground paint areas of the image that are associated with the road or road features such as intersection related painted features (e.g., as described with respect to FIG. 2 above).

In step 603, the inpainting module 203 generates or otherwise obtains a binary or equivalent image that contains the pixels of the image belonging to the ground paint category (e.g., as determined by the semantic segmentation described above). The binary image can be binary with respect to depicting a pixel as either on or off depending on whether the pixel is classified as ground paint or non-ground paint. For example, the pixel can be displayed as off (e.g., black) when the pixel is semantically classified in the non-ground paint category and displayed as on (e.g., white) when the pixel is semantically classified in the ground paint category, or vice versa. The resulting binary image effectively isolates and displays only those pixels associated with ground paint.

In step 605, the inpainting module 203 generates a hole-filled binary image by filling in the binary image to generate one or more curvilinear structures from the one or more pixels classified as ground paint. In one embodiment, this hole-filling or inpainting is content-aware because it is performed with the constraint of obtaining structures that are to be used as vGCPs (e.g., intersection-related features or any other features designated by the mapping platform 103). Because intersection-related features generally are curvilinear, the inpainting module 203 can apply the constraint of obtaining curvilinear structures using a set of structuring elements. Structuring elements can be shapes or other structures that serve as templates for creating curvilinear structures from pixels of the binary image. For example, the structuring elements can be shapes or structures expected to be found at intersections such as but not limited to the lane boundaries, crosswalk corners, bus stop corners, gore points, limit lines, etc. (e.g., as shown in FIG. 2). The resulting hole-filled image will then be a binary image in which the degraded paint areas of the ground features have been reconstructed appear as if they were before paint degradation.

In step 607, the image correction module 205 determines the difference between the original binary image and the hole-filled binary image to identify one or more degraded or faded ground paint pixels of the image. The difference, for instance, would subtract any pixels classified as ground paint pixels in the binary image from the hole-filled binary image to generate a difference image that includes only those ground paint pixels that have been filled as part of the hole-filling or inpainting process of step 605. The pixels remaining in the difference image can then be used to identify the faded ground paint pixels in the original input image. For example, the x, y pixel coordinates of a pixel appearing in the difference would identify the coordinates of the corresponding pixel in the original image that has degraded or faded paint.

In one embodiment, the output module 607 can provide the identified degraded or faded ground paint pixels as an output. In addition or alternatively, the image correction module 205 can use the identified degraded ground paint pixels to make corrections to the original input image to fill in the faded paint areas. For example, under optional step 609, the image correction module 205 can replace the pixel values of the degraded ground paint pixels with values corresponding to ground paint pixels that were not degraded or faded. In other words, the image correction module 203 replaces a color value of the one or more degraded ground paint pixels in the image with a ground paint color value to create an output image. This can be performed, for instance, by aggregating (e.g., averaging) the intensity and/or color values of other ground paint pixels so that the image correction module 205 determines the ground paint color value from a respective color value of the one or more pixels of the input image that are classified in the ground paint category (e.g., during the semantic segmentation step 601 above).

In one embodiment, the image correction module 205 can use contextual information to infer missing pixels based on neighboring pixels. In other words, the image correction module 205 determine the respective color values for adjusting a faded ground paint pixel based on the color values of its neighboring ground paint pixels. In one embodiment, the neighboring pixels can be adjacent ground paint pixels that are within a proximity threshold (e.g., within 1 pixel, 2 pixels, etc.) of the one or more degraded ground paint pixels.

In step 611, the output module 207 can provide the identified ground paint pixels and/or the paint corrected output as an output that can used by other applications, services, functions, etc. For example, the resulting image can be utilized for feature labeling, for instance, to determine vGCPs. The corrected image will advantageously have more visible or complete paints line that can be presented to human labelers. In this way, the human labeler will be able to more accurately identify the center points and midlines for labeling to generate more accurate vGCPs.

In another use case, the output module 207 can use the output of degraded ground paint pixels to identify images with degraded or faded ground paint. For example, if an image has more than a threshold number of identified degraded ground paint pixels, the output module 207 can mark or flag the image as having faded ground paint. In one embodiment, images or portions of images that are marked as having degraded ground paint can be excluded from annotation objects in addition to or instead of correcting them.

FIGS. 7A-7E are diagrams illustrating an example of detecting degraded ground paint in an image 701, according to one embodiment. In this example, the image 701 of FIG. A is captured by a ground level vehicle 101 and depicts a roadway that contains an intersection and lane lines with degraded paint. The mapping platform 103 processes the image 701 to semantically segment the pixels of the image 701 into ground paint and non-ground paint categories (e.g., using a trained machine learning system 107 alone or in combination with a computer vision system 109).

Figure 7B:
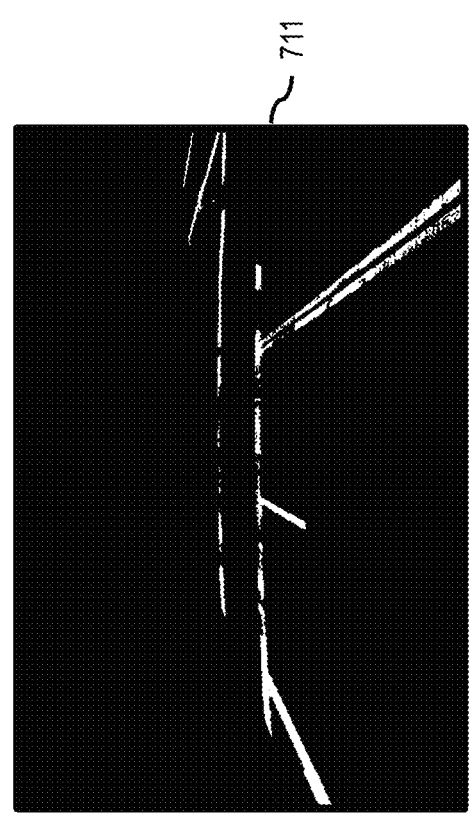
FIGS. 7A-7E are diagrams illustrating an example of detecting degraded ground paint in an image, according to one embodiment.
Figure 7A:
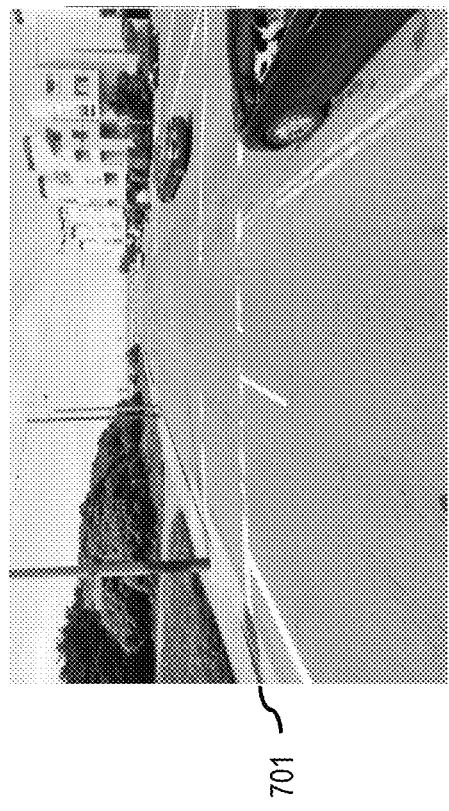

The mapping platform 103 uses the semantic segmentation of the image 701 to generate a binary image 711 of FIG. 7B that depicts pixels classified in the ground paint category in white and non-ground paint pixels in black. As shown in FIG. 7C, the mapping platform 103 performs content-aware inpainting or hole-filling of the binary image 711 to generate a hole-filled image 721 that fills in the areas of the binary image 711 based on curvilinear structural constraints or structuring elements corresponding to expected intersection features and lane lines. This results in the hole-filled image 721 smoothing or filling areas to approximate what the intersection features are predicted to look like before any paint degradation.

Figure 7D:
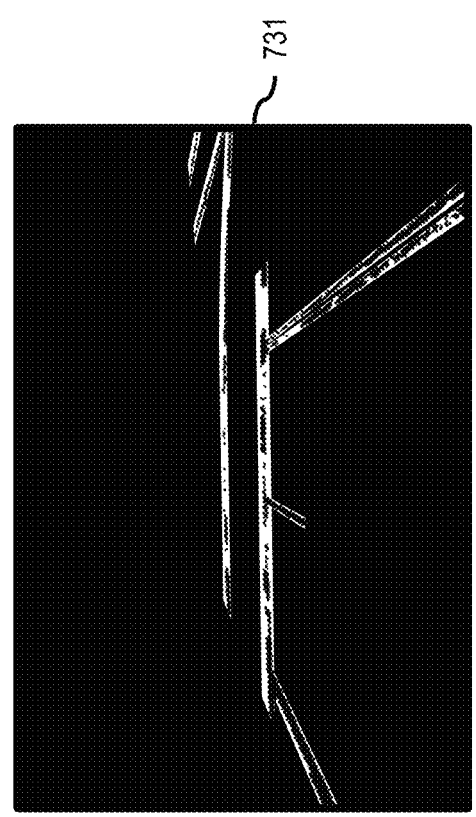
Figure 7C:
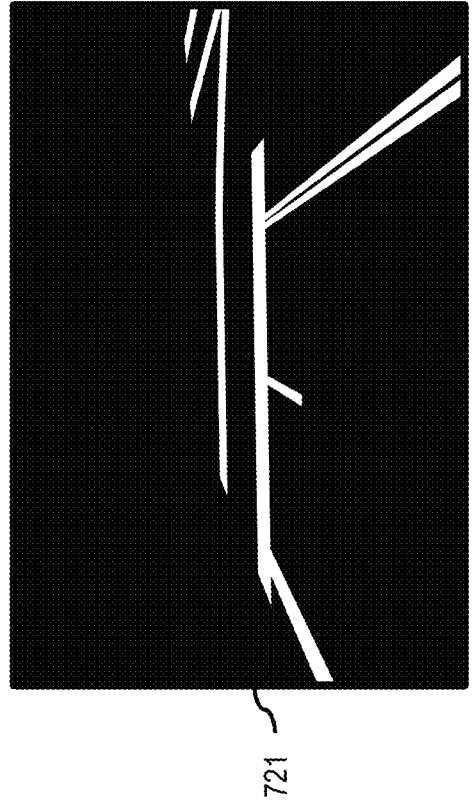
Figure 7E:
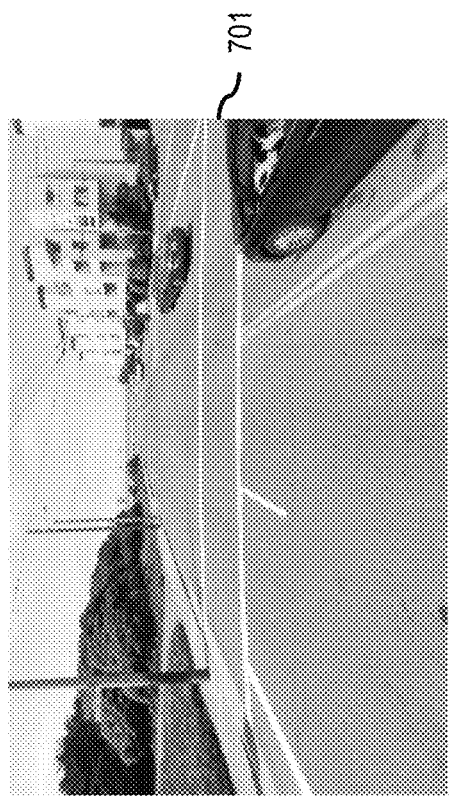

Then, to identify the faded ground paint pixels, the mapping platform 103 can subtract the ground paint pixels of the binary image 711 from the hole-filled binary image 721 to generate a difference image 731 of FIG. 7D. The mapping platform uses the identified faded ground paint pixels of the image 731 identify what pixels of the original image 701 to correct. In one embodiment, the mapping platform 103 uses the color values/intensities of ground paint pixels neighboring the faded ground paint pixels (e.g., neighboring within a threshold proximity) to determine what color values to replace the faded ground paint pixels with. The result of the correction process to fill in faded ground paint pixels is shown as image 741 of FIG. 7E. In comparison to the original image 701, the corrected image 741 has intersection and lane lines that are filled in and appear as they were before paint degradation.

Once a set of images are processed to correct degraded paint according to the embodiments described herein, they can be used to generate a set of annotated or human-created observations (e.g., ground truth images of intersections features). For example, to generate the ground truth data, correspondences among detected feature points in the paint corrected images can be determined by human labelers with visual aids to orient and co-register multiple images or through automated means (e.g., brute-force matching, approximate nearest neighbors, supervised deep neural networks, etc.). The output of this process is a set of ground truth images labeled with learnable map features/ground control points.

The machine learning system 107 can present this ground truth image data to a machine learning model during training using, for instance, supervised deep convolutional networks or equivalent. In other words, a machine learning model can be trained using the ground truth images to identify ground control points (e.g., vGCPs) depicted in an input image. Generally, a machine learning model (e.g., a neural network, set of equations, rules, decision trees, etc.) is trained to manipulate an input feature set to make a prediction about the feature set or the phenomenon/observation that the feature set represents. In one embodiment, the training features for the machine learning model include the determined pixel correspondence or pixel location of the selected map features/ground control points in the ground truth images.

In one embodiment, the machine learning system 107 can incorporate a supervised learning model (e.g., a logistic regression model, RandomForest model, and/or any equivalent model) to train a machine learning model using the ground truth image data together with the labeled ground control points. For example, during training, the machine learning system 107 uses a learner module that feeds images and derived feature sets (e.g., pixel correspondences, image attributes, etc.) into the machine learning model to compute a predicted feature set (e.g., predicted ground control points presented in input images and/or other characteristics of ground control points) using an initial set of model parameters.

The learner module then compares the predicted feature set to the ground truth data (e.g., images labeled with known ground control point pixel locations and/or attributes). For example, the learner module computes a loss function representing, for instance, an accuracy of the predictions for the initial set of model parameters. In one embodiment, the learner module computes a loss function for the training of the machine learning model based on the ground truth images. The learner module then incrementally adjusts the model parameters until the model minimizes the loss function (e.g., achieves a maximum accuracy with respect to the manually marked labels). In other words, a "trained" feature prediction model is a classifier with model parameters adjusted to make accurate predictions with respect to the ground truth data.

Figure 8:
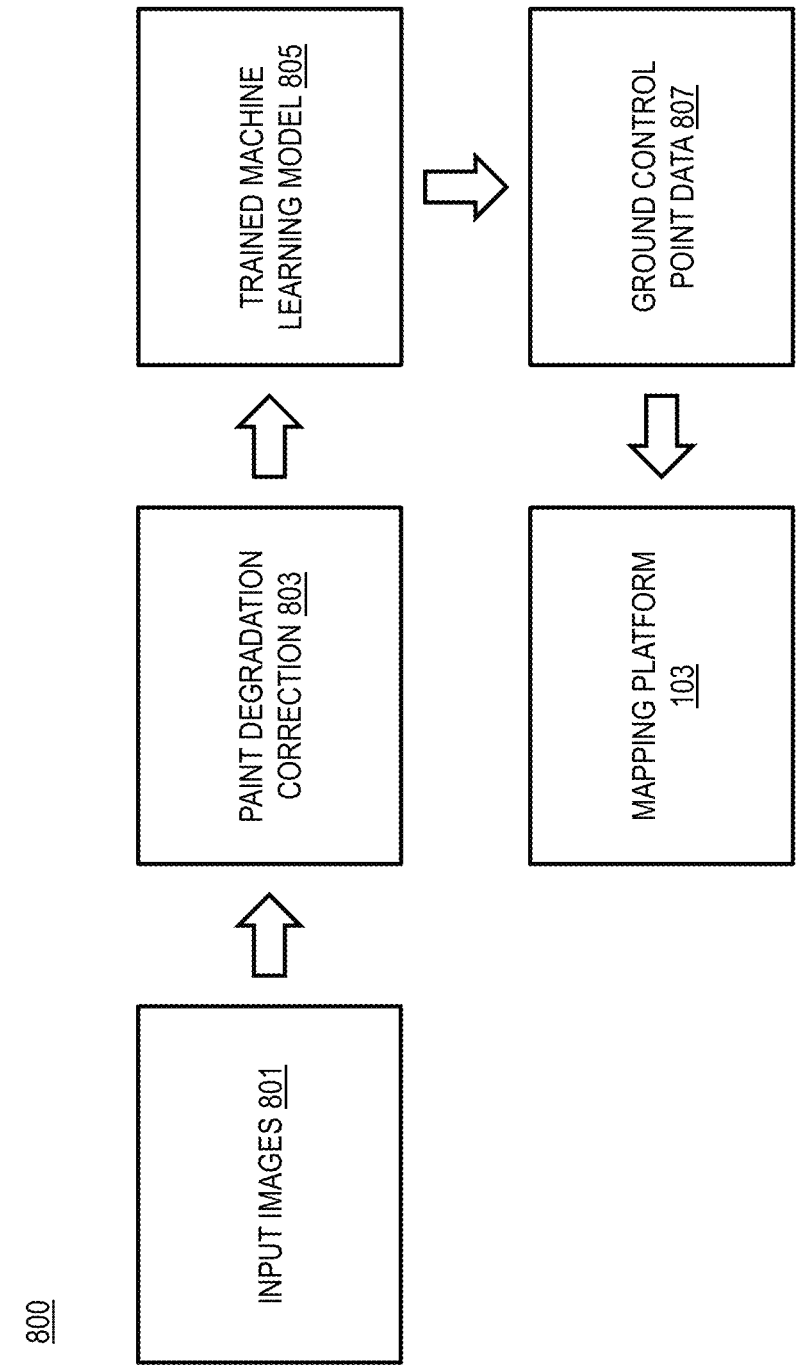
FIG. 8 is a diagram illustrating a workflow for using degraded ground paint correction, according to one embodiment.

FIG. 8 is a diagram illustrating a workflow for using degraded ground paint correction, according to one embodiment. As shown in the process 800 of FIG. 8, a set of input images 801 is obtained, and then processed to performed paint degradation correction 803 to detect and correct any degraded paint for any features depicted in the images 801 according to the embodiments described herein. The mapping platform 103 then uses a trained machined learning model 805 (e.g., of the machine learning system 107) to generate ground control points (e.g., ground control point data 807). This ground control point data 807 can then be provided to the mapping platform 103 and/or any other component of the system 100 (e.g., services platform 111, services 113, vehicle 101, etc.) for the purposes listed above or other purposes that rely on ground control points. Because capturing images is generally a less resource intensive process than deploying ground surveyors to manually determine ground control points, the system 100 can capture a series of input images 801 to cover a wider geographical area more frequently for automated processing by the machine learning system 107. As a result, the embodiments described herein for determining ground control points from image data can advantageously provide for scalable, relatively inexpensive, high accuracy ground control point data 805 (e.g., vGCPs) that is also easy to keep up-to-date (e.g., thereby reducing invalid or obsolete ground control points).

Returning to FIG. 1, as shown, the system 100 includes the mapping platform 103 which incorporates the machine learning system 107 for using degraded ground detection and correction to determine ground control points from image data according the various embodiments described herein. In addition, the mapping platform 103 can include the computer vision system 109 configured to use machine learning to perform semantic segmentation and/or detect objects or features (e.g., intersection features) depicted in images that can be used as ground control points. For example, with respect to autonomous, navigation, mapping, and/or other similar applications, the computer vision system 109 can detect ground control points in input images and generate ground control point data (e.g., location data) and associated prediction confidence values/uncertainties, according to the various embodiments described herein. In one embodiment, the machine learning system 107 includes a neural network or other machine learning system to make predictions from machine learning models. For example, when the input to the machine learning model are images used for visual odometry, the features of interest can include ground control points detected in the images to support localization of, e.g., a vehicle 101 or other similar applications within the sensed environment. In one embodiment, the neural network of the machine learning system 107 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the mapping platform 103 also has connectivity or access to a geographic database 105 which stores the degraded ground paint detections, corrected images, learned ground control points, and/or related data generated according to the embodiments described herein. In one embodiment, the geographic database 105 includes representations of mapped ground control points and related geographic features to facilitate visual odometry to increase localization accuracy. In one embodiment, the mapping platform 103 have connectivity over a communication network 119 to the services platform 111 that provides one or more services 113. By way of example, the services 113 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 113 uses the output of the machine learning system 107 and/or of the computer vision system 109 (e.g., ground control point data) to localize the vehicle 101 or UE 115 (e.g., a portable navigation device, smartphone, portable computer, tablet, etc.) to provide services 113 such as navigation, mapping, other location-based services, etc.

In one embodiment, the mapping platform 103 may be a platform with multiple interconnected components. The mapping platform 103 may include multiple servers, intelligent networking devices, computing devices, components and corresponding software for providing parametric representations of lane lines. In addition, it is noted that the mapping platform 103 may be a separate entity of the system 100, a part of the one or more services 113, a part of the services platform 111, or included within the UE 115 and/or vehicle 101.

In one embodiment, content providers 121a-121m (collectively referred to as content providers 121) may provide content or data (e.g., including geographic data, parametric representations of mapped features, etc.) to the geographic database 105, the mapping platform 103, the services platform 111, the services 113, the UE 115, the vehicle 101, and/or an application 117 executing on the UE 115. The content provided may be any type of content, such as map content, textual content, audio content, video content, image content, etc. In one embodiment, the content providers 121 may provide content that may aid in the detecting and classifying of lane lines and/or other features in image data and estimating the quality of the detected features. In one embodiment, the content providers 121 may also store content associated with the mapping platform 103, computer vision system 109, services platform 111, services 113, UE 115, and/or vehicle 101. In another embodiment, the content providers 121 may manage access to a central repository of data, and offer a consistent, standard interface to data, such as a repository of the geographic database 105.

In one embodiment, the UE 115 and/or vehicle 101 may execute a software application 117 to capture image data or other observation data for determining ground control points or using ground control points and/or detect degraded ground paint according the embodiments described herein. By way of example, the application 117 may also be any type of application that is executable on the UE 115 and/or vehicle 101, such as autonomous driving applications, mapping applications, location-based service applications, navigation applications, content provisioning services, camera/imaging application, media player applications, social networking applications, calendar applications, and the like. In one embodiment, the application 117 may act as a client for the mapping platform 103 and perform one or more functions associated with determining ground control points from image data alone or in combination with the machine learning system 107.

By way of example, the UE 115 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 115 can support any type of interface to the user (such as "wearable" circuitry, etc.). In one embodiment, the UE 115 may be associated with the vehicle 101 or be a component part of the vehicle 101.

In one embodiment, the UE 115 and/or vehicle 101 are configured with various sensors for generating or collecting environmental image data (e.g., for processing by the mapping platform 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 115 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 115 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 115 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 107, computer vision system 109, services platform 111, services 113, UE 115, vehicle 101, and/or content providers 121 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 9 is a diagram of a geographic database, according to one embodiment. In one embodiment, the geographic database 105 includes geographic data 901 used for (or configured to be compiled to be used for) mapping and/or navigation-related services, such as for video odometry based on the mapped features (e.g., lane lines, road markings, signs, etc.). In one embodiment, the geographic database 105 includes high resolution or high definition (HD) mapping data that provide centimeter-level or better accuracy of map features. For example, the geographic database 105 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 903, road segment or link data records 905, POI data records 907, ground control point data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 105. In one embodiment, the indexes 913 may be used to quickly locate data without having to search every row in the geographic database 105 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 907. The geographic database 105 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 105 can also include ground control point data records 909 for storing the ground control point data, degraded paint corrected imagery, learnable map features, as well as other related data used according to the various embodiments described herein. In addition, the ground control point data records 909 can also store ground truth training and evaluation data, machine learning models, annotated observations, and/or any other data generated or used by the system 100 according to the various embodiments described herein. By way of example, the ground control point data records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 105 can be maintained by the content provider 121 in association with the services platform 111 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 115) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining ground control points from image data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
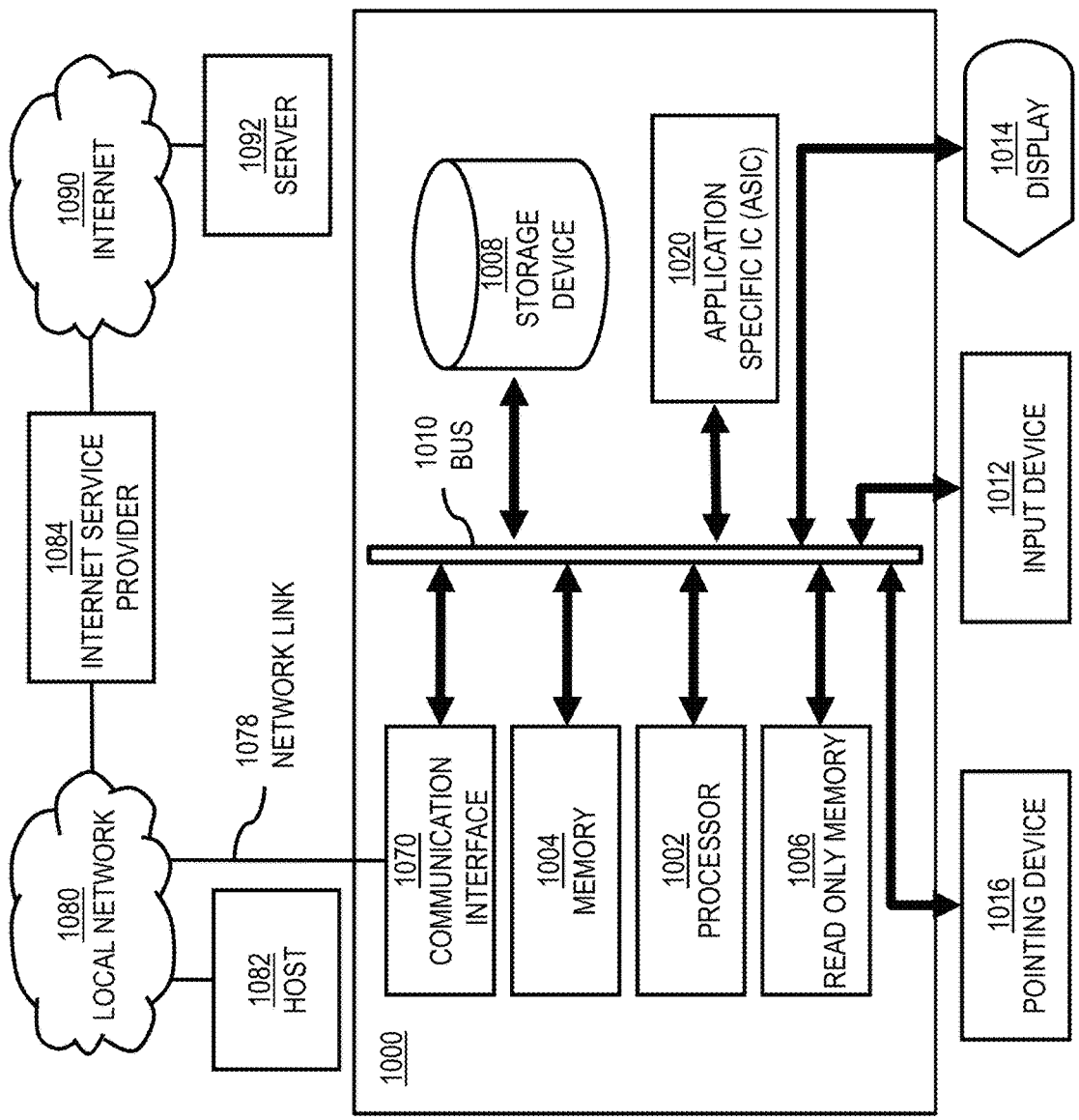
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to determine ground control points from image data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to determining ground control points from image data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for determining ground control points from image data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining ground control points from image data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system

1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 119 for determining ground control points from image data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 11:
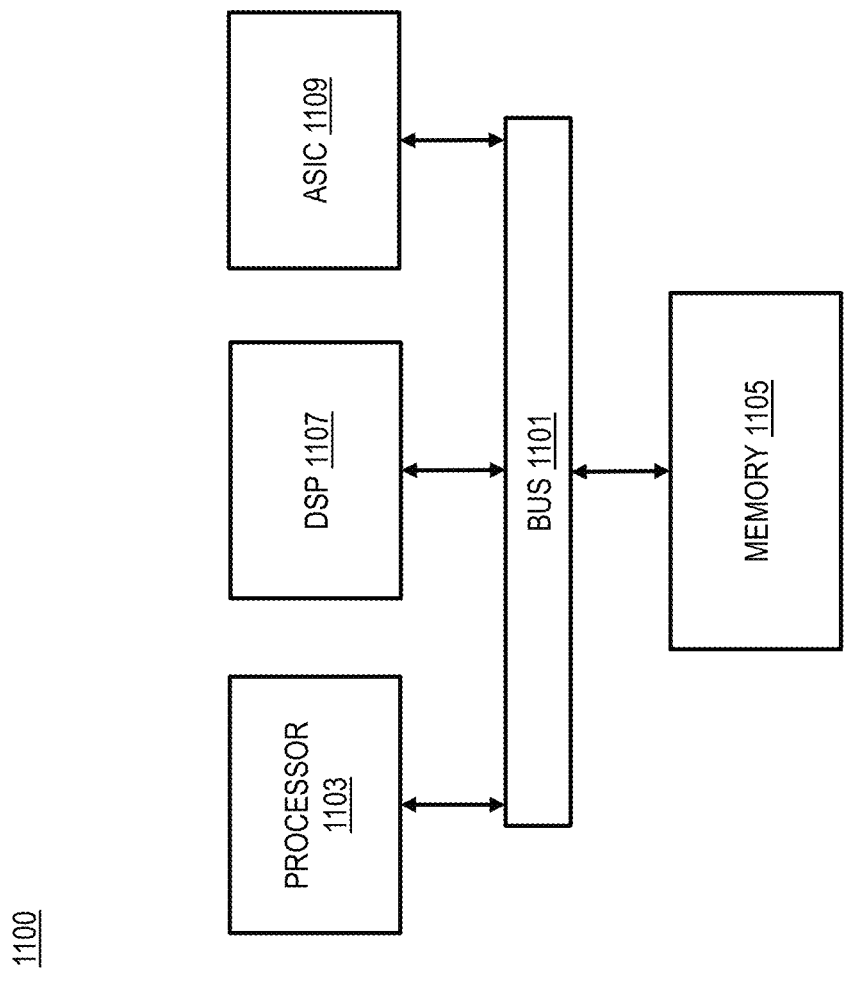
FIG. 11 is a diagram of a chip set that can be used to implement an embodiment.

FIG. 11 illustrates a chip set 1100 upon which an embodiment of the invention may be implemented. Chip set 1100 is programmed to determine ground control points from image data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine ground control points from image data. The memory 1105 also stores the data associated with or generated by the execution of the inventive steps.

Figure 12:
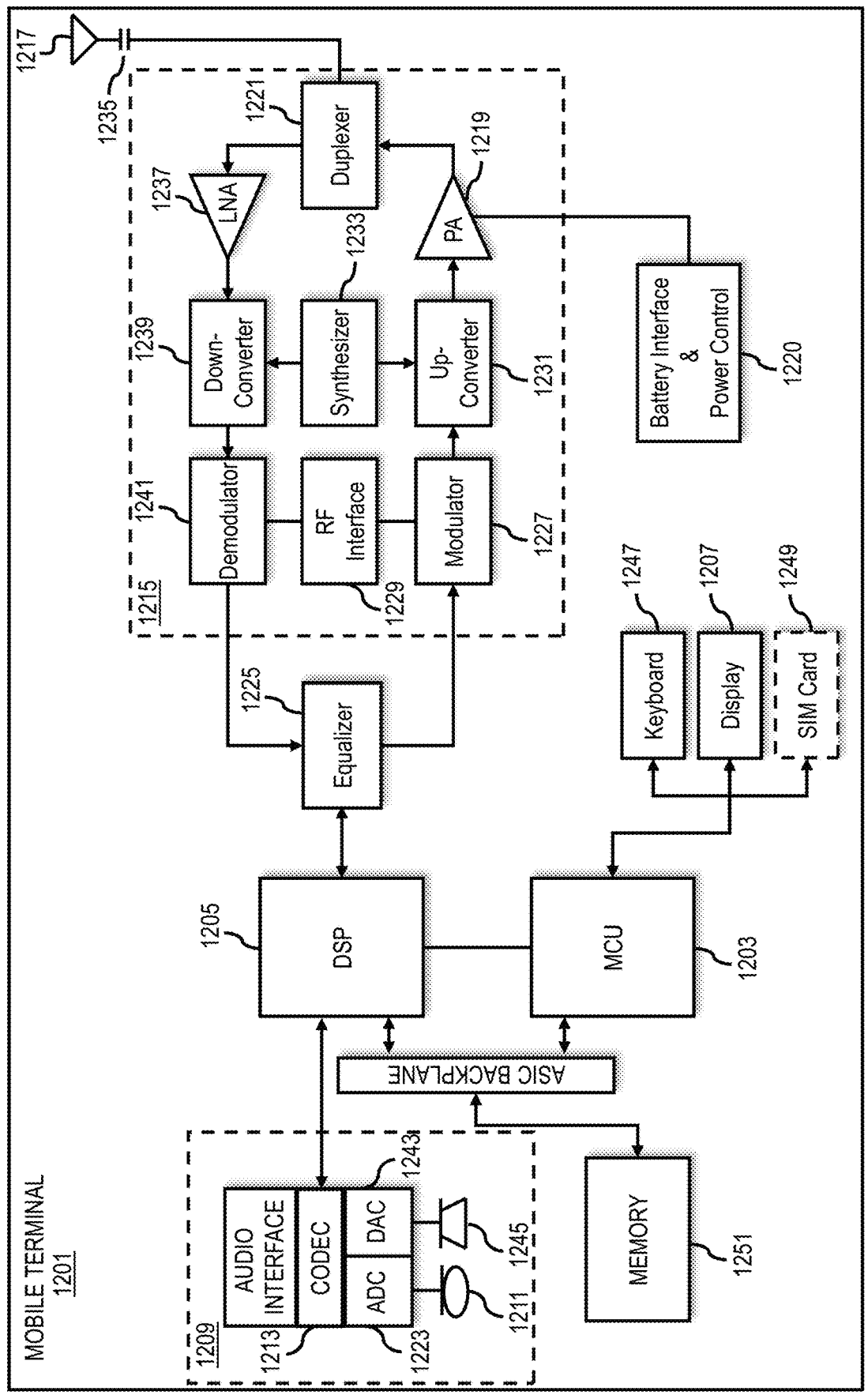
FIG. 12 is a diagram of a mobile terminal (e.g., handset) that can be used to implement an embodiment.

FIG. 12 is a diagram of exemplary components of a mobile terminal (e.g., UE 115 or embedded component of the vehicle 101) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to determine ground control points from image data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for detecting degraded ground paint in an image comprising:
   performing semantic segmentation on the image to determine one or more pixels of the image that are classified in a ground paint category;
   generating a binary image that contains the one or more pixels of the image that are classified in the ground paint category;
   generating a hole-filled binary image by filling in the binary image to generate one or more curvilinear structures from the one or more pixels;
   determining a difference between the image and the hole-filled binary image to identify one or more degraded ground paint pixels of the image; and
   providing the one or more degraded ground paint pixels as an output.

2. The method of claim 1, further comprising:
   replacing a color value of the one or more degraded ground paint pixels in the image with a ground paint color value to create an output image.

3. The method of claim 2, further comprising:
   determining the ground paint color value from a respective color value of the one or more pixels of the image that are classified in the ground paint category.

4. The method of claim 3, wherein the one or more pixels of the image from which the ground value is determined are within a proximity threshold of the one or more degraded ground paint pixels.

5. The method of claim 2, wherein the ground paint color value is an aggregate value based on the respective color value of the one or more pixels of the image that are classified in the ground paint category.

6. The method of claim 2, further comprising:
   providing the output image for feature labeling.

7. The method of claim 6, wherein the feature labeling is used from determining a ground control point.

8. The method of claim 1, further comprising:
   identifying the image as a faded ground paint image based on the one or more degraded ground paint pixels.

9. The method of claim 8, wherein the faded ground paint image is excluded from feature labeling.

10. An apparatus for detecting degraded ground paint in an image comprising:
    at least one processor; and
    at least one memory including computer program code for one or more programs,
    the at least one memory and the computer program code configured to, with the at least one processor, cause the apparatus to perform at least the following,
       perform semantic segmentation on the image to determine one or more pixels of the image that are classified in a ground paint category;
       generate a binary image that contains the one or more pixels of the image that are classified in the ground paint category;
       generate a hole-filled binary image by filling in the binary image to generate one or more curvilinear structures from the one or more pixels;
       determine a difference between the image and the hole-filled binary image to identify one or more degraded ground paint pixels of the image; and
       provide the one or more degraded ground paint pixels as an output.

11. The apparatus of claim 10, wherein the apparatus is further caused to:
    replace a color value of the one or more degraded ground paint pixels in the image with a ground paint color value to create an output image.

12. The apparatus of claim 11, wherein the apparatus is further caused to:
    determine the ground paint color value from a respective color value of the one or more pixels of the image that are classified in the ground paint category.

13. The apparatus of claim 12, wherein the one or more pixels of the image from which the ground value is determined are within a proximity threshold of the one or more degraded ground paint pixels.

14. The apparatus of claim 11, wherein the ground paint color value is an aggregate value based on the respective color value of the one or more pixels of the image that are classified in the ground paint category.

15. The apparatus of claim 11, wherein the apparatus is further caused to:
    provide the output image for feature labeling.

16. A non-transitory computer-readable storage medium for detecting degraded ground paint in an image, carrying one or more sequences of one or more instructions which, when executed by one or more processors, cause an apparatus to perform:
    performing semantic segmentation on the image to determine one or more pixels of the image that are classified in a ground paint category;
    generating a binary image that contains the one or more pixels of the image that are classified in the ground paint category;
    generating a hole-filled binary image by filling in the binary image to generate one or more curvilinear structures from the one or more pixels;
    determining a difference between the image and the hole-filled binary image to identify one or more degraded ground paint pixels of the image; and
    providing the one or more degraded ground paint pixels as an output.

17. The non-transitory computer-readable storage medium of claim 16, wherein the apparatus is caused to further perform:
    replacing a color value of the one or more degraded ground paint pixels in the image with a ground paint color value to create an output image.

18. The non-transitory computer-readable storage medium of claim 17, wherein the apparatus is caused to further perform:
    determining the ground paint color value from a respective color value of the one or more pixels of the image that are classified in the ground paint category.

19. The non-transitory computer-readable storage medium of claim 18, wherein the one or more pixels of the image from which the ground value is determined are within a proximity threshold of the one or more degraded ground paint pixels.

20. The non-transitory computer-readable storage medium of claim 17, wherein the ground paint color value is an aggregate value based on the respective color value of the one or more pixels of the image that are classified in the ground paint category.

* * * * *